United States Patent
Tiesler et al.

(10) Patent No.: US 6,976,568 B2
(45) Date of Patent: Dec. 20, 2005

(54) CLUTCH ARRANGEMENT IN A TRANSMISSION HAVING TWO AXIALLY AND RADIALLY ADJACENT CLUTCHES

(75) Inventors: Peter Tiesler, Meckenbeuren (DE); Jörg Dausend, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/715,703

(22) Filed: Nov. 18, 2003

(65) Prior Publication Data

US 2005/0103594 A1 May 19, 2005

(51) Int. Cl.⁷ .............................................. F16D 25/10
(52) U.S. Cl. ................................................. 192/87.11
(58) Field of Search ........................... 192/48.91, 70.2, 192/87.11, 87.12, 87.15, 106 F

(56) References Cited

U.S. PATENT DOCUMENTS

| | | | |
|---|---|---|---|
| 3,161,270 A * | 12/1964 | Aschauer ................ | 192/87.11 |
| 3,365,985 A * | 1/1968 | Johnson ................... | 192/87.11 |
| 3,744,605 A * | 7/1973 | Piret ........................ | 192/70.2 |
| 3,747,727 A * | 7/1973 | Dach et al. .............. | 192/70.2 |
| 3,844,393 A * | 10/1974 | Zaiser ...................... | 192/87.11 |
| 3,922,932 A | 12/1975 | Maurice et al. | |
| 4,082,171 A * | 4/1978 | Lalin et al. .............. | 192/70.2 |
| 4,440,282 A | 4/1984 | Ishimaru et al. | |
| 4,732,253 A * | 3/1988 | Hiramatsu et al. ....... | 192/87.11 |
| 4,759,432 A | 7/1988 | Jurgens et al. | |
| 5,031,743 A * | 7/1991 | Morishita et al. ........ | 192/85 AA |
| 5,180,043 A * | 1/1993 | Walker .................... | 192/70.2 |
| 5,987,728 A | 11/1999 | Townsend et al. | |
| 6,059,682 A * | 5/2000 | Friedmann et al. ...... | 192/87.15 |
| 6,347,695 B1 * | 2/2002 | Kuhn et al. .............. | 192/106 F |
| 6,401,896 B1 | 6/2002 | Schnepf | |

FOREIGN PATENT DOCUMENTS

| | | |
|---|---|---|
| DE | 26 19 479 C2 | 7/1982 |
| DE | 36 11 003 C1 | 10/1987 |
| DE | 39 36 871 C2 | 9/1998 |
| DE | 100 13 180 A1 | 9/2001 |
| DE | 698 16 733 T2 | 4/2004 |
| DE | 103 33 431.9 | 2/2005 |
| FR | 1.324.457 | 3/1963 |
| WO | WO-01/42673 A1 | 6/2001 |
| WO | WO 01/42674 A1 * | 6/2001 |
| WO | WO-02/40900 A2 | 5/2002 |

* cited by examiner

Primary Examiner—Rodney H. Bonck
(74) Attorney, Agent, or Firm—Davis & Bujold, P.L.L.C.

(57) ABSTRACT

A clutch arrangement in a transmission, particularly in an automatic transmission or automated selector transmission in the design of a double clutch transmission, having two axially and radially adjacent multi-disc clutches (B, E) in which an inner discs (23) of the radially inner clutch (E) are situated upon an inner disc carrier (37) and an outer discs (21) of the radially outer clutch (B) upon an outer disc carrier (38) while an inner discs (22) of the radially outer clutch (B) and an outer discs (24) of the radially inner clutch (E) are situated upon a common disc carrier (9). It is further provided that discs (23, 24) of radially inner disc set (40) axially support themselves against a guard ring (16) fastened on the common disc carrier (9). To achieve a clutch arrangement that spares space and is economical, it is proposed that the discs (21, 22) of a radially outer disc set (39) can be axially pressed against a contact section (7) of the common disc carrier (9) which consists of a radially outwardly pointing end piece of the common disc carrier (9).

17 Claims, 4 Drawing Sheets

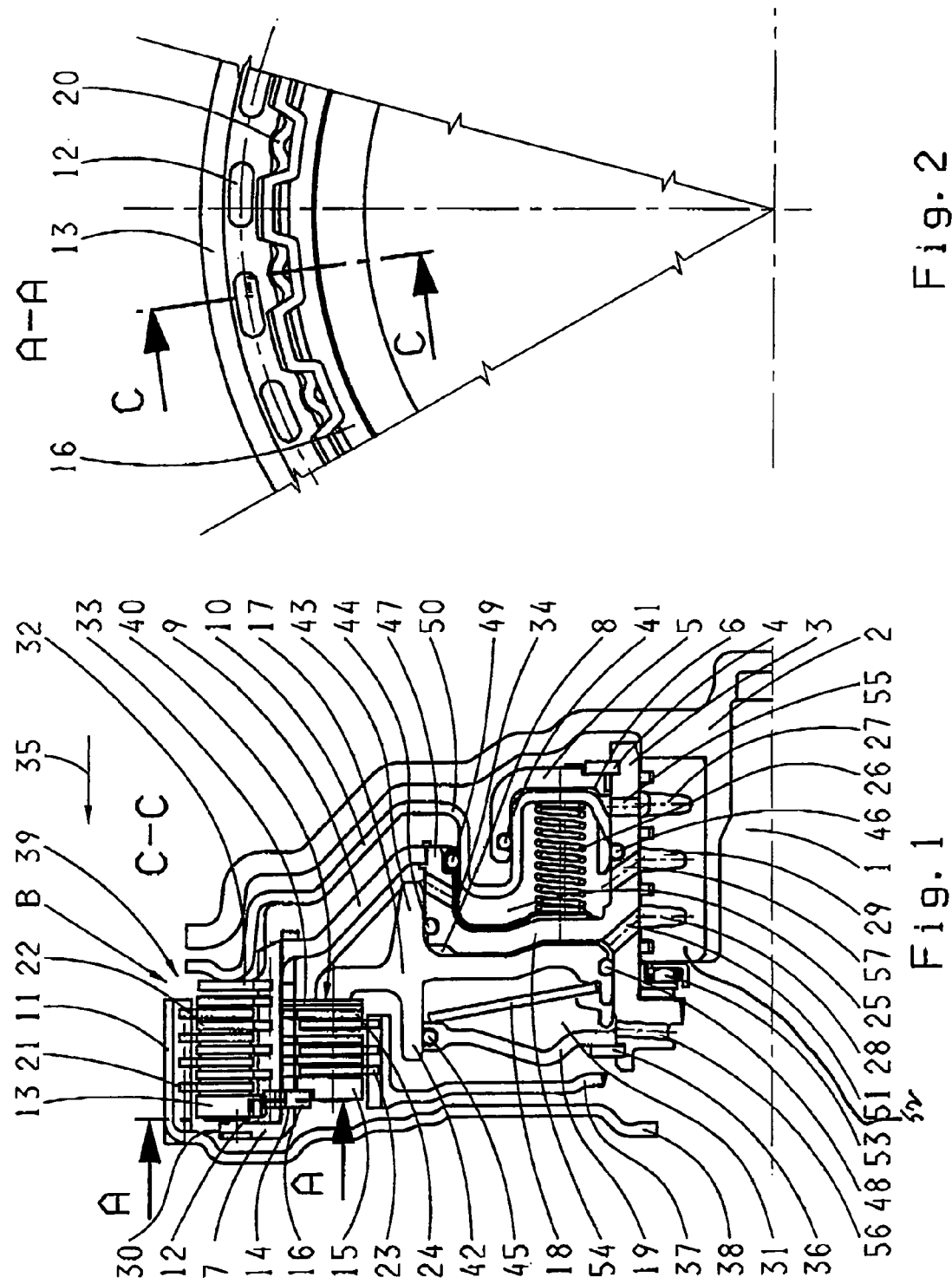

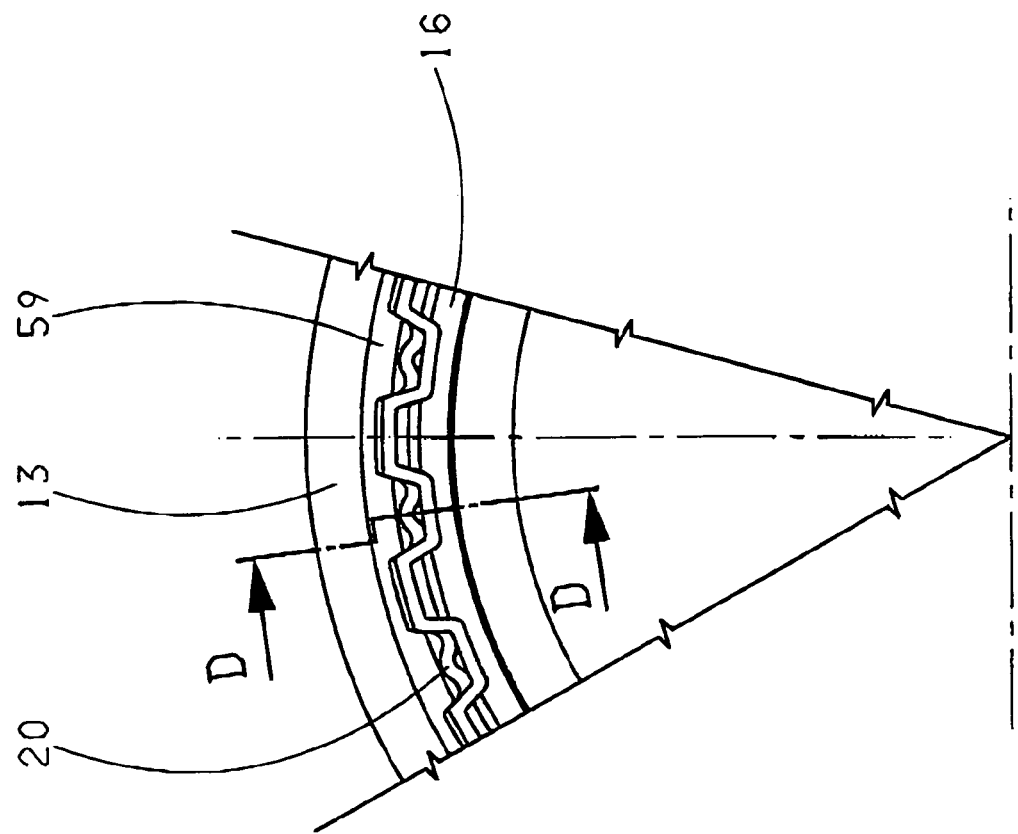
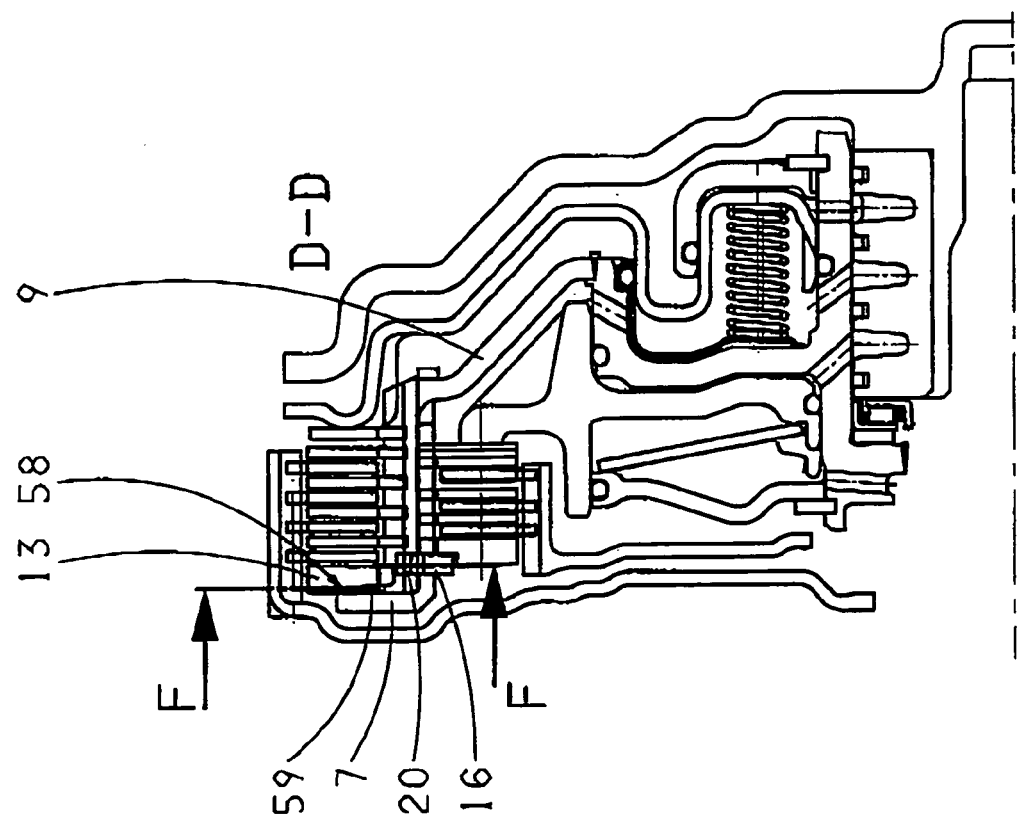

CLUTCH ARRANGEMENT IN A TRANSMISSION HAVING TWO AXIALLY AND RADIALLY ADJACENT CLUTCHES

According to the preamble of claim 1 the invention relates to a clutch arrangement in a transmission, particularly in an automatic transmission or automated selector transmission.

Abundant examples exist for the arrangement of clutches and of the actuation devices thereof in automatic transmissions. U.S. Pat. No. 6,120,410 thus shows a clutch arrangement in an automatic transmission in which one part of substantially cup-shaped cross section is designed as outer disc carrier. Radially within the outer disc carrier the inner and outer discs of two multi-disc clutches disposed axially side-by-side and at equal radial height are clutch-cylinder arrangements designed having each one actuating piston for actuating both clutches, the same as pressure compensation spaces for a dynamic pressure compensation regarding the actuation force of the actuating pistons.

From the applicant's not pre-published German patent application DE 103 33 431.9 is also known a clutch arrangement in an automatic transmission two axially adjacent multi-disc clutches with each of which are associated on piston-cylinder arrangement for axial clutch actuation, one pressure compensation space for a dynamic clutch actuation compensation and means for lubricant and coolant supply. The clutch arrangement stands out by the facts that both clutches are radially consecutively disposed, that the pressure compensation space for the radially outer clutch abuts axially on the pressure space for actuation of the piston of the radially inner clutch, and that the lubricant or coolant current for the radially outer clutch can be tapped directly from the pressure compensation space for actuation of the outer clutch.

From said publication can further be understood that between the pressure space for actuation of the piston of the radially inner clutch and the pressure compensation space for the piston of the radially outer clutch is located a common disc carrier for both clutches on which both the inner discs of the radially inner clutch are non-rotatably and axially movably fastened together.

From the not pre-published German patent application DE 103 33 437.8 is finally known a clutch arrangement similar to the last cited clutch arrangement where the end discs of the radially inner and of the radially outer multi-disc clutches are secured with regard to their axial mobility by a radially inner or radially outer snap ring on the common inner disc carrier. For accommodating said two snap rings respective recesses are made on the common inner disc carrier the production of which is expensive.

In addition, it can be understood from said publication as another alternative that on the common inner disc carrier a recess is cuttingly made for inserting a snap ring for the end disc of the outer discs of the radially inner disc set while the end disc of the radially outer disc set supports itself on the embossing of the recess. This embossing recess is made of the material which, through the recess, had been radially pressed across the common inner disc carrier. Even though this technical solution is economically favorable, from the point of view of functional efficiency it is associated with the disadvantage that the axial position of the outer disc set can be selected depending on the position of the inner disc set and thus is not the best from the point of view of installation space.

The invention is based on this point which is to solve the problem of introducing a space-saving clutch arrangement for a transmission which can be economically produced as result of its structural features.

The solution of said problem results from the features of the main claim while advantageous developments and improvements of the invention can be understood from the sub-claims.

Accordingly, the invention departs from a clutch arrangement in a transmission, particularly an automatic transmission or automated selector transmission, which has two axially and radially adjacent multi-disc clutches B and E where the inner discs of the radially inner clutch E are disposed upon an inner disc carrier and the outer discs of the radially outer clutch B upon an outer disc carrier. In addition, it is provided in this clutch arrangement that the inner discs of the radially outer clutch B and the outer discs of the radially inner clutch E is situated upon a common disc carrier, that respective inner discs and outer discs of both clutches B, E form disc sets disposed axially alternatively to each other, and that with each disc set is associated an actuating piston of servo devices actuatable by pressure medium for axial compression of the disc sets. The two servo devices are disposed so that the clutches B and E be closingly actuatable in the same axial direction. Besides, it is provided in this clutch arrangement that the discs of the radially inner disc set are axially pressable against one guard ring fastened on the common disc carrier. The clutch arrangement system for solving the stated problem is furthermore characterized by the fact that the discs of the radially outer disc set are pressable against a contact section of the common disc carrier which consists of one radially outwardly pointing end area of the common disc carrier.

This inventive construction makes it possible to keep the axial length of the clutch arrangement small in comparison with the known solutions, which in the narrow conditions in the transmission is known to be of special importance, especially in automatic transmissions and also in automated selector transmissions in the design of a double clutch transmission.

It can furthermore be provided that the common disc carrier consists of a sheet metal shaped part in which the contact section is an integral part of the same and formed by a molding process. Thereby the common disc carrier can be especially economically produced and the position of both discs, relative to each other, can be selected arbitrarily and easily.

In another development of the invention, both disc sets are each axially limited on their side pointing away from the piston by an end disc so that said end discs abut on said guard ring or on the contact section.

Another development of an inventively designed clutch arrangement provides that the guard ring be fastened on a receiving groove. The receiving groove preferably consists of radial spaced apart openings which are made peripherally distributed on the common disc carrier.

In addition, it is deemed advantageous that the openings, forming the receiving groove are shaped by material recesses through which the sheet metal material designated as embossing of the common disc carrier point radially outwardly. This construction avoids a cutting processing of the common disc carrier thus sparing production costs.

It can be provided in development of said construction that the section of the clutch discs, specially of the inner discs of the radially outer clutch B, the same as the radial extension of the embossing is selected so that on the radial outer side of the common disc carrier enough space is available for the end disc of the radially outer clutch B wholly or partly placed over the area of the material recesses.

It can further be provided that the contact section of the common disc carrier be shaped so that the stiffness of the latter is positively influenced.

To ensure a clutch actuation without problems, especially with radially untilted end disc of the radially outer disc set, it is also proposed that the contact section of the common disc carrier have on its side, pointing axially to the disc set of the radially outer clutch B, peripherally distributed nubs or a contact ring on which abuts the end disc of the disc set of the clutch B when pressurized by the associated actuating piston.

In another embodiment of the invention, it can be provided that said end disc of the radially outer clutch B has on its side axially pointing to the contact section of the common disc carrier a radially stepped surface.

The contact nubs, the contact ring or the step on said end disc are preferably designed so that parts of the common disc carrier situated radially beneath said parts of the contact section are axially overlapped preventing a tilting of the end disc contrary to an exact radial alignment.

To illustrate the invention, with the specification is enclosed a drawing diagrammatically showing two inventively designed clutch arrangements. The figures show in detail:

FIG. 1 a cross section through an automatic transmission in the area of two multi-disc clutches according to a first alternative;

FIG. 2 a partial cross section A—A through the clutch arrangement according to FIG. 1;

FIG. 3 a cross section through an automatic transmission in the area of two multi-disc clutches according to a second alternative;

FIG. 4 a partial cross section F—F through the clutch arrangement according to FIG. 3;

FIG. 5 a sectional enlargement from FIG. 1 in the area of the clutch disc sets; and FIG. 6 a sectional enlargement from FIG. 3 likewise in the area of the clutch disc sets.

FIG. 1 shows a cross section through a transmission in the area of two multi-disc clutches B and E which are disposed in a transmission housing 2 both radially and axially directly adjacent to each other. The construction of the clutch arrangement selected here provides that the clutch E be located radially directly beneath the outer clutch B.

FIG. 2 shows a sectional graph of the area A—A, according to FIG. 1, seen from the direction marked by the two arrows in FIG. 1. The sectional plane C—C plotted in FIG. 2 marks the side view of the parts in the area of said parting line in FIG. 1.

Figure 5:
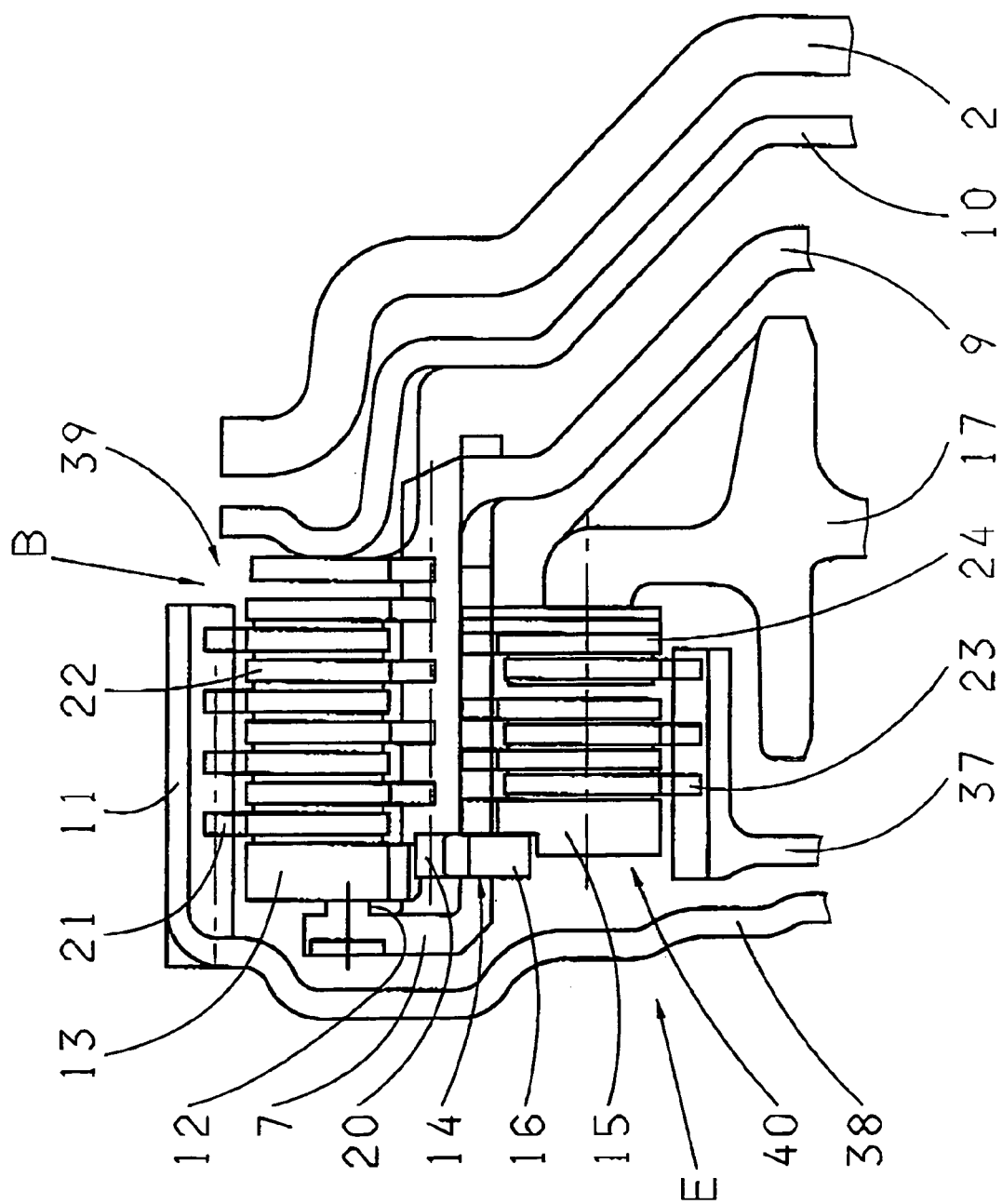
Figure 6:
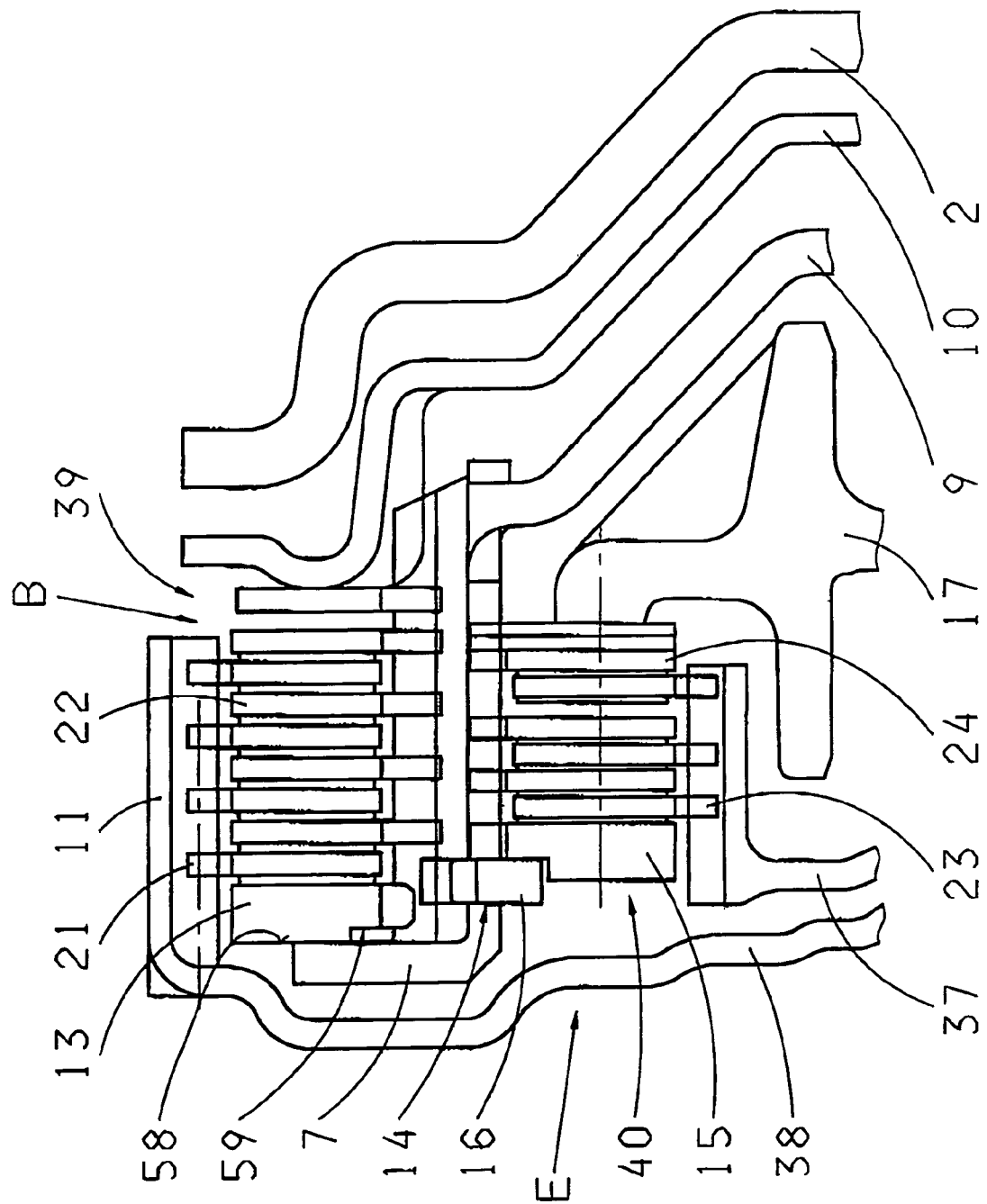

To the core components of this clutch arrangement belong two disc sets 30 and 40, corresponding outer and inner disc carriers 37, 38, the same as clutch actuating pistons 10, 17 of servo devices actuatable by pressure medium by means of which both clutches can be closed in the same direction of actuation. In said clutch arrangement, the constructional design of a common disc carrier 9 is of special importance.

This common disc carrier 9 is preferably formed from a deformed sheet metal piece and has available a radial section which is situated in the area of the side near the transmission housing of the clutches E, B, the same as a substantially horizontal section on which are axially movably and non-rotatably situated the inner discs 22 of the radially outer clutch B and the outer discs 24 of the radially inner clutch E.

To said clutch arrangement belong, in addition, the outer disc carrier 38 of the outer clutch B and the inner disc carrier 37 of the inner clutch E both situated on the sides of the clutches E and B removed from the transmission and non-rotatably connected with the transmission shafts (not shown in detail here).

As the segment enlargement of FIG. 5 particularly shows, on the common disc carrier 9 there are blocks for disc sets 39, 40 of both clutches B, E against which support themselves via end discs 13, 15, the actuation forces exerted by said actuating pistons 10, 17 upon discs 21, 22; 23, 24. At the same time the end disc 15 of the radially inner clutch E abuts axially on a sap ring 16 braced in a receiving groove 14 upon the common disc carrier 9.

Said receiving groove 14 is formed in the embodiment selected here by recesses in the common disc carrier 9 whose sheet metal material deformation 20 on the common inner disc carrier 9 points radially outwardly. At the same time, the receiving section for the end disc 13 of the radially outer disc set 39 and the radial extension of the embossing of the recesses is selected so that there is still space enough for the end disc 13 of the disc set 39 lying wholly or partly over the area of the deformations 20. In principle, said deformations 20 result, therefore, by a combined cutting and stamping process with a cutter of defined outline, the cutting operation developing with defined cutting depth radially outwardly departing from the enclosed disc spline section of the disc carrier 9.

It can be alternatively provided that the openings of the common disc carrier 9 forming the receiving groove 14 be cuttingly made in the form of a circular groove interrupted by tooth gaps on the periphery.

From FIG. 1 and FIG. 2 can also be seen that on the edge of the common disc carrier 9 pointing away from the transmission housing 2, a contact section 7 is made for contact of the end disc 13 of the radially outer clutch B. Said contact section 7 preferably consists of a radially outwardly deformed axial end 30 of the common inner disc carrier 9.

Said contact section 7 is preferably designed so as to exert a strengthening effect upon the common disc carrier 9 which advantageously takes effect, in particular regarding the mechanical strength and stiffness of said metal part, at relatively high speeds and under comparatively high load.

A further aspect of the invention concerns the reliable contact of the end disc 13 of the radially outer clutch B with the radial contact section 7 of the common disc carrier 9. In this alternative of the invention, it is provided for that purpose that there be made on the contact section 7 axially aligned contact nubs 12 which point axially in direction to the end disc 13 of the outer disc set 39 of the clutch B. Instead of the contact nubs 12, this contact section 7 can also have, with the same effect, a ring land pointing axially to the discs 21, 22 of the clutch B available.

On the side of the clutch discs 21, 22; 23, 24 axially opposite the snap ring 16 or the contact section 7, there is axially movably situated on each of the two clutches B, E, upon the common disc carrier 9, a pressure ring 32, 33 (for example, in the form of a corrugated spring) against which an actuation force for closing the clutches can be exerted by means of said pistons 10, 17. The closing force acts in both clutches E, B in the same direction 35.

The servo devices for actuating both clutches are designed as piston-cylinder arrangements integrated in the transmission. In the embodiment of the invention shown here, the cylinder of the actuating arrangement for the radially outer clutch B is made of two parts; one cylinder portion 5 consisting a sheet metal part with one radially and one axially aligned section.

This part 5 produced as sheet metal shaped part by a die cast process is slipped on a hub 3 and secured by means of a guard ring 4 against an axial movement in direction to the transmission housing 2. By means of this design, the radially outwardly pointing side of the hub 3 forms the second part of the cylinder of the actuating arrangement for the radially outer clutch B.

The hub 3 is aligned coaxially with the disc sets 39, 40 of both clutches B, E, sits upon an axial prolongation 52 of the transmission housing 2 and is there axially supported on an axial bearing 53. Also to be noted in this connection is that on the hub 3 a radially extending section 54 is made which is part of the common disc carrier 9 or at least operatively connected therewith.

Reverting to the actuation or servo device for the radially outer clutch B, it must be said that to this belongs the already mentioned actuating piston 10 which is axially movably incorporated in a cylinder 5 forming a pressure space 6. Said piston 10 is guided near the transmission housing 2 to the radially outer clutch B and brought to abut on the pressure ring 32 thereof.

On the side of the actuating piston 10, remote from the pressure space 6, a pressure compensation chamber 25 is made for said piston 10, other wall parts being formed by the hub 3 or by the radial section 54 thereof.

In this pressure compensation space 25 is located a recoil spring 26 paraxially aligned to the actuation direction 35 and whose one end presses against the side of the actuating piston 10 removed from the pressure compensation chamber and whose other end supports itself on a baffle plate 34.

The baffle plate 34 for its part is clamped between the radial section 34 of the hub 3 and a paraxial section 47 of the common disc carrier 9 so as to rest in the area of the section 47 on a paraxial section 50 of the actuating piston 10.

It is to be mentioned in this connection that between the actuating piston 10 and the cylinder part 5 or the hub 3, the same as between the piston 10 and the baffle plate 34, sealing elements 41, 46, 49 are situated by means of which the pressure space 6 and the pressure compensation space 25 are sealed relative to each other and against non-pressurized areas of the transmission.

The pressure space 6 for the piston-cylinder arrangement 3, 5, 10 for actuating the outer piston B is supplied with an actuation pressure medium via a hole 55 in the hub 3 which for its part is connected by inflow technique with a hole or peripheral groove 27 in the prolongation 52 of the transmission housing 2.

The pressure compensation space 25 is filled with a lubricant and/or coolant via a hole 57 in the hub 3 which is fed by a hole or peripheral groove 29 in the prolongation 52 of the transmission housing 2, which hole for its part is connected with a hole in the drive shaft 1.

With regard to the filling of a pressure space 8 for actuating the radially enclosed clutch E, it is provided that the filling take place via a hole 51 in the hub 3 which is in flow connection with a separate hole or annular groove 28 in the prolongation 52 of the transmission housing 2.

The actuating device for the radially inner clutch E is formed by a piston-cylinder arrangement whose already mentioned pressure space 8 is limited by a paraxial section of the hub 3, the side of the radial section 54 of the hub 3 pointing away from the baffle plate 34 and a section 43 of the actuating piston 17 of said actuating device.

The actuating piston 17 for actuation of the radially inner clutch LE has a substantially "t"-shaped cross sectional geometry with a radially inner section, a radially outer section, a left-hand side "t" leg 42 pointing away from the common disc carrier 9 and the right-hand side "t" leg 43 pointing toward the common disc carrier 9. The "t" leg 43 pointing to the common disc carrier 9 is here axially guided upon the paraxial section 47 of the common disc carrier 9.

The pressure space 8 is, in addition, sealed against the hub 3 by a sealing agent 44 between the common disc carrier 9 and the right-hand "t" leg 43 of the actuating piston 17, the same as via a sealing agent 48 on the radially innermost section of the actuating piston 17.

Upon the side of the actuating piston 17, opposite the pressure space 8 of the actuating device for the inner clutch E, a pressure compensation space 31 is formed for said piston 17. The supply with coolant or lubricant is via a hole 56 in the hub 3 and a hole (not shown here) in the transmission shaft 1.

In said pressure compensation space 31 is located a recoil spring 18 which axially supports itself by one side on the actuating piston 17 and by its other side on a baffle disc 19. This baffle disc 19 is slipped on the hub 3 and axially secured by means of a snap ring 36. Said baffle disc 19 carries, on its radial end, a sealing agent 45 by means of which the pressure compensation chamber 31 is sealed against the left-hand "t" leg of the disc carrier 9.

Besides, reference is made to the outer disc carrier 38 of the radially outer clutch B which, on a paraxial radially outer section 11, carries the outer discs 21.

Differing from the described construction of the clutch arrangement according to FIGS. 1, 2, and 5, FIGS. 3, 4 and 6 show that the end disc 13 of the radially outer clutch B can be designed stepped on its side axially pointing to the contact section 7. To this end, the inner diameter of this end disc 13 is selected, for example, large enough for a contact surface 58 of the end disc 13 reliably to come into contact with that of the contact section 7 of the common disc carrier 9.

An axial step 59 ensures that the end disc 13 is not induced to a tilting movement upon the common disc carrier 9. In this embodiment of the invention can then be omitted the contact nubs 12 of the contact section 7 of the common disc carrier 9.

It is clear to those skilled in the art that for the transmission housing 2 (mentioned in the embodiments described above) another part can be substituted such as a rotary shaft or another clutch body.

REFERENCES 1. transmission shaft
2. transmission housing
3. hub
4. guard ring
5. cylinder section for the servo device of clutch B
6. pressure space for clutch B
7. contact section on the common disc carrier
8. pressure space for clutch E
9. common disc carrier for clutches B and E
10. actuating piston for clutch B
11. paraxial section on the disc carrier of clutch B
12. contact nubs
13. end disc of clutch B
14. receiving groove in the common disc carrier
15. end disc of clutch E
16. snap ring, guard ring 17. actuating piston of clutch E
18. recoil spring for the piston of clutch E
19. baffle plate of clutch E
20. embossing on the common disc carrier
21. outer discs of clutch B
22. inner discs of clutch B
23. inner discs of clutch E
24. outer discs of clutch E
25. pressure compensation space for clutch B
26. recoil spring
27. hole or peripheral groove in the prolongation 52
28. hole or peripheral groove in the prolongation 52
29. hole or peripheral groove in the prolongation 52
30. end of the common disc carrier
31. pressure compensation space for clutch E
32. pressure ring for clutch B
33. pressure ring for clutch E
34. baffle plate in the pressure compensation space for clutch B
35. closing direction of clutches B and E
36. snap ring
37 inner disc carrier of inner clutch E
38. outer disc carrier of outer clutch B
39. outer disc set
40. inner disc set
41. sealing agent
42. left-hand "t" leg of the actuating piston 17
43. right-hand "t" leg of the actuating piston 17
44. sealing agent
45. sealing agent
46. sealing agent
47. paraxial section of the common disc carrier 9
48. sealing agent
49. sealing agent
50. paraxial section of the actuating piston 10
51. filling line for pressure space 8
52. axial prolongation of the transmission housing
53. axial bearing
54. central section of the common disc carrier 9 or radial section of the hub 3
55. hole in the hub 3 for supply of the pressure space 6
56. hole in the hub 3 for supply of the pressure compensation space 31
57. hole in the hub 3 for supply of the pressure compensation space 25
58. contact surface of the end disc 13
59. step in the end disc 13

What is claimed is:

1. A clutch arrangement in a transmission having two axially and radially adjacent multi-disc clutches (B, E) in which inner discs (23) of a radially inner clutch (E) are situated upon an inner disc carrier (37) and an outer discs (21) of a radially outer clutch (B) are situated upon an outer disc carrier (38), inner discs (22) of said radially outer clutch (B) and outer discs (24) of said radially inner clutch (E) are situated upon a common disc carrier (9), in which the respective inner discs and outer discs of said two clutches (B, E) form axially alternatively disc sets (39, 40) situated side by side, in which with each disc set (39, 40) is associated one actuating piston (10, 17) of servo devices actuatable by pressure medium for axial compression of said disc sets (39, 40), both servo devices being disposed so that both clutches (B, E) is closingly actuatable in a same direction (35) and in which said discs (23, 24) of said radially inner disc set (40) can be axially pressed against a separate guard ring (16) fastened on said common disc carrier (9), wherein said discs (21, 22) of said radially outer disc set (39) can be axially pressed against a contact section (7) of said common disc carrier (9) which consists of one radially outwardly pointing end piece of said common disc carrier (9); and wherein said common disc carrier (9) is a sheet metal shaped part in which the contact section (7) is an integral part thereof and is formed by a deforming process.

2. The clutch arrangement according to claim 1, wherein said disc sets (39, 40) are each axially limited on a side pointing away from said pistons (10, 17) by an end disc (13, 15).

3. The clutch arrangement according to claim 1, wherein said guard ring (16) is secured in a receiving groove (14) on said common disc carrier (9).

4. The clutch arrangement according to claim 3, wherein said receiving groove (14) consists of radial openings spaced relative to each other and which are peripherally distributed on said common disc carrier (9).

5. The clutch arrangement according to claim 4, wherein said openings that form said receiving groove (14) are shaped by material recesses in said common disc carrier (9) through which sheet metal pieces (20) of said common disc carrier (9) point radially outwardly.

6. The clutch arrangement according to claim 5, wherein a section of the inner discs (22) of said radially outer clutch, the same as a radial extension of an embossing (20) is selected so that on the radial outer side of said common disc carrier (9) there is sufficient space for an end disc (13) of said radially outer clutch (B) wholly or partly placed over the area of the material recesses or receiving groove (14).

7. The clutch arrangement according to claim 4, wherein said openings that form said receiving groove (14) are cuttingly produced as a circular groove interrupted by tooth gaps.

8. The clutch arrangement according to claim 1, wherein said contact section (7) of said common disc carrier (9) is shaped so that the stiffness of the latter is positively influenced.

9. The clutch arrangement according to claim 1, wherein said contact section (7) of said common disc carrier (9) has on a side pointing axially to said disc set (39) of said radially outer clutch (B), contact nubs (12) on which abuts an end disc (13) of said disc set (39).

10. The clutch arrangement according to claim 1, wherein said contact section (7) of said common disc carrier (9), on a side axially pointing to said disc set (39) of said radially outer clutch (B), has a contact ring.

11. The clutch arrangement according to claim 10, wherein contact nubs (12) of one of said contact ring or a step (59) are designed so that component parts of said common disc carrier (9) situated radially beneath said parts are axially overlapped.

12. The clutch arrangement according to claim 1, wherein an end disc (13) has on a side axially pointing to said contact section (7) of said common disc carrier (9) a radially stepped surface with one step (59).

13. The clutch arrangement according to claim 1, wherein the transmission is an automatic transmission.

14. The clutch arrangement according to claim 1, wherein the transmission is an automated selector transmission in the design of a double clutch transmission.

15. A clutch arrangement in a transmission having two axially and radially adjacent multi-disc clutches comprising
a radial inner clutch (E) in which inner discs (23) of the radial inner clutch (E) are situated upon an inner disc carrier (37);

a radial outer clutch (B) in which outer discs (21) of the radial outer clutch (B) are situated upon an outer disc carrier (38);

inner discs (22) of said radially outer clutch (B) and outer discs (24) of said radially inner clutch (E) are situated upon a common disc carrier (9), in which the respective inner discs and outer discs of said two clutches (B, E) form axially alternatively disc sets (39, 40) situated side by side;

a first and a second servo devices each having an actuating piston (10, 17) associated with each disc set (39, 40) and actuatable by a pressure medium for axial compression of said disc sets (39, 40), both servo devices being disposed so that both clutches (B, E) is closingly actuatable in a same direction (35);

a separate guard ring fastened on said common carrier against which said discs (23, 24) of said radially inner disc set (40) can be axially pressed; and a contact section comprising a contiguous end portion of the common carrier which extends axially beyond the separate guard ring to form an integral, radially outwardly deformed axial end 30 of the common inner disc carrier (9) wherein said discs (21, 22) of said radially outer disc set (39) can be axially pressed against the contact section.

16. The clutch arrangement in a transmission as set forth in claim 15 wherein the integral, radially outwardly deformed axial end (30) of the common inner disc carrier (9) forming the contact section extends at a substantially 90 degree angle from the common carrier.

17. The clutch arrangement in a transmission as set forth in claim 15 wherein the integral, radially outwardly deformed axial end (30) of the common inner disc carrier (9) further comprises an axially directed piece (12) radially spaced from the common carrier forming a C-shaped contact section.

* * * * *